(12) United States Patent
Kim et al.

(10) Patent No.: US 9,918,072 B2
(45) Date of Patent: Mar. 13, 2018

(54) PHOTOGRAPHY APPARATUS AND METHOD THEREOF

(71) Applicant: SAMSUNG ELECTRONICS CO., LTD., Suwon-si (KR)

(72) Inventors: Jae-gon Kim, Suwon-si (KR); Kyong-tae Park, Suwon-si (KR); Chong-sam Chung, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 314 days.

(21) Appl. No.: 14/735,824

(22) Filed: Jun. 10, 2015

(65) Prior Publication Data
US 2016/0037152 A1    Feb. 4, 2016

(30) Foreign Application Priority Data

Jul. 31, 2014    (KR) ........................ 10-2014-0098379

(51) Int. Cl.
| | |
|---|---|
| H04N 13/02 | (2006.01) |
| G06T 7/593 | (2017.01) |
| G06T 7/557 | (2017.01) |
| H04N 13/00 | (2018.01) |

(52) U.S. Cl.
CPC ........... *H04N 13/025* (2013.01); *G06T 7/557* (2017.01); *G06T 7/593* (2017.01); *H04N 13/0007* (2013.01); *H04N 13/0217* (2013.01); *H04N 13/0232* (2013.01); *H04N 13/0257* (2013.01); *G06T 2207/10024* (2013.01); *H04N 13/0022* (2013.01); *H04N 13/0239* (2013.01); *H04N 13/0282* (2013.01); *H04N 2013/0081* (2013.01)

(58) Field of Classification Search
CPC .. H04N 13/025; H04N 13/0217; G06T 7/557; G06T 7/593
See application file for complete search history.

(56) References Cited

U.S. PATENT DOCUMENTS

| | | | | |
|---|---|---|---|---|
| 2012/0274626 | A1* | 11/2012 | Hsieh ................. | H04N 13/0011 345/419 |
| 2013/0107001 | A1* | 5/2013 | Lim ................... | H04N 13/0239 348/46 |
| 2014/0132735 | A1* | 5/2014 | Lee ...................... | H04N 5/2258 348/47 |
| 2015/0381869 | A1* | 12/2015 | Mlinar ................. | H04N 5/3696 348/222.1 |
| 2016/0088245 | A1* | 3/2016 | Nakata ................. | H04N 9/045 250/201.2 |

FOREIGN PATENT DOCUMENTS

KR        10-0891549 B1    4/2009

* cited by examiner

*Primary Examiner* — Nam Pham
(74) *Attorney, Agent, or Firm* — Sughrue Mion, PLLC

(57) ABSTRACT

An image photographing apparatus is provided. The image photographing apparatus includes a first photographing unit configured to photograph an image by using a phase difference image sensor, a second photographing unit configured to be spaced on a side of the first photographing unit, a controller configured to generate a first depth map by using a first image photographed by the first photographing unit and generate a second depth map by using a second image photographed by the second photographing unit, and an image processor configured to generate a three-dimensional (3D) image by using the first depth map and the second depth map.

20 Claims, 15 Drawing Sheets

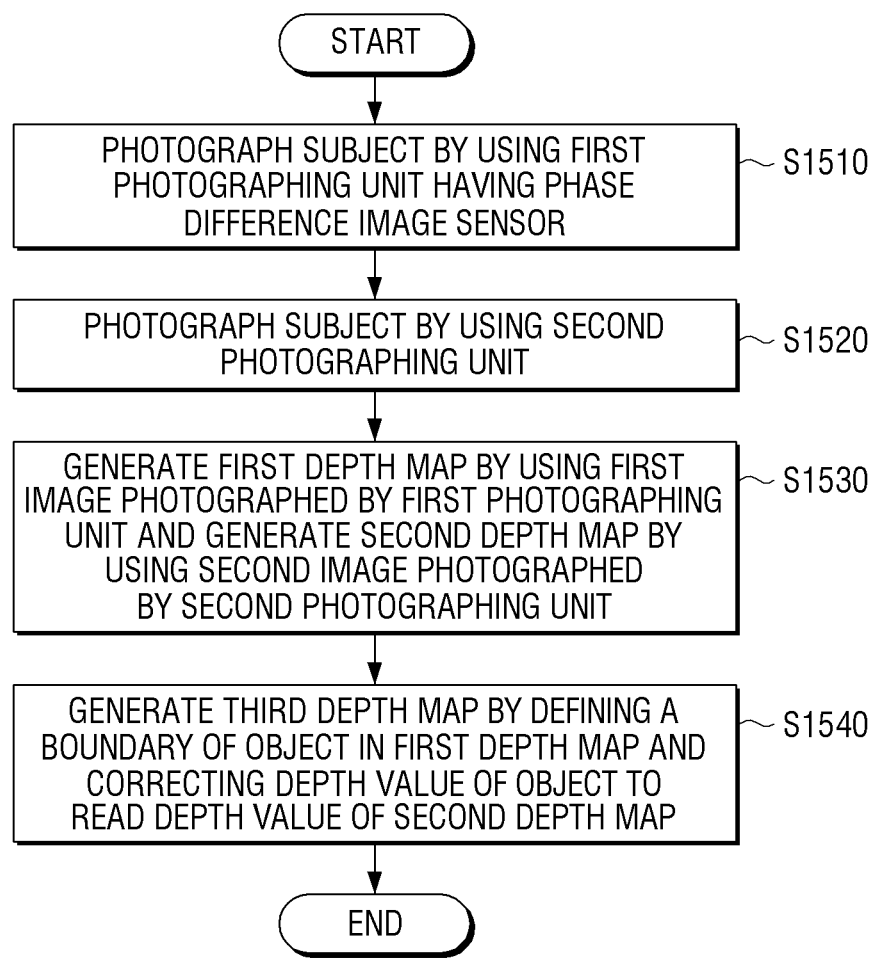

PHOTOGRAPHY APPARATUS AND METHOD THEREOF

CROSS-REFERENCE TO RELATED APPLICATION

This application claims priority from Korean Patent Application No. 10-2014-0098379, filed on Jul. 31, 2014, in the Korean Intellectual Property Office, the disclosure of which is incorporated herein by reference in its entirety.

BACKGROUND

1. Field

Methods and apparatuses consistent with exemplary embodiments relate to a photography apparatus, and more particularly, to a photography apparatus for photographing a high-quality three-dimensional (3D) image and a photography method thereof.

2. Description of Related Art

With the development of 3D image technologies, a camera for photographing a 3D image has been developed.

A perceivable 3D effect may be roughly divided into monocular cues and binocular cues. Monocular cues may be based on a degree of thickness change of a crystalline lens according to a position of an object to be observed, a difference in angle between both eyes and an object, a difference in positions and shapes of an object observed by each eye, disparity due to movement of an object, psychological or memory-related effects, and the like.

The binocular cues use binocular disparity, which occurs as both eyes are spaced 6 to 7 cm from each other in a horizontal direction. Such binocular cue may be the most important factor of a 3D effect. That is, a human observes an object from two different angles due to the binocular disparity, and each eye recognizes a different image due to the difference. In response to the different images being transferred to a brain through retinas, the brain precisely combines the different images, and the viewer is able to recognize the original 3D image.

In general, a 3D image camera photographs a subject by giving a certain distance between a left eye image and a right eye image, thereby maximizing the 3D effect. In response to generating a 3D image, the 3D image camera generates a depth map to set a depth value with respect to a subject of the image.

A depth map is a table including depth information on each area of a 3D image. The depth information relates to each area or each pixel of a 3D image frame, and represents a distance between the area or pixel, and a viewing position. An object having far depth is an image part shown as being distant from a viewing position, and an object having close depth is an image part shown as being close to the viewing position. A 3D camera photographs a left eye image and a right eye image by using two camera modules and calculates a depth map by using the left eye image and the right eye image.

Quality of the depth map varies depending upon a distance between the two camera modules. Specifically, as the distance between the two camera modules increases, the depth map accurately expresses depth information, but a boundary of an object becomes unclear due to data loss of an area where the left eye image and the right image overlap. As the distance between the two camera modules decreases, an accurate object may be obtained because the area where the left eye image and the right image overlap is reduced, but the depth map may not accurately express the distance to the object.

Accordingly, there is a need for a 3D image photographing apparatus capable of generating a depth map having accurate and abundant depth information.

SUMMARY

The present disclosure has been provided to address the aforementioned and other problems and disadvantages occurring in the related art, and an aspect of the present disclosure provides a 3D image photographing apparatus which secures an extensive detection area and generates a depth map having accurate and abundant depth information.

An image photographing apparatus according to an exemplary embodiment includes a first photographing unit configured to photograph an image by using a phase difference image sensor, a second photographing unit configured to be spaced on a side of the first photographing unit, a controller configured to generate a first depth map by using a first image photographed by the first photographing unit and generate a second depth map by using a second image photographed by the second photographing unit, and an image processor configured to generate a three-dimensional (3D) image by using the first depth map and the second depth map.

At least a part of pixels among entire pixels constituting the phase difference image sensor may be a plurality of phase difference pixels which are placed in a horizontal direction.

The first photographing unit and the second photographing unit may be placed in a horizontal direction. In addition, a separation distance between the first photographing unit and the second photographing unit may be greater than a phase difference of the plurality of phase difference pixels.

At least a part of pixels of the entire pixels constituting the phase difference image sensor may be a plurality of phase difference pixels which are placed in a vertical direction.

The first photographing unit and the second photographing unit may be placed in a vertical direction. In addition, a separation distance between the first photographing unit and the second photographing unit may be greater than a phase difference of the plurality of phase difference pixels.

At least a part of pixels of the entire pixels constituting the phase difference image sensor may be a plurality of phase difference pixels which are placed in a diagonal direction.

The first photographing unit and the second photographing unit may be placed in a diagonal direction. In addition, a separation distance between the first photographing unit and the second photographing unit may be greater than a phase difference of the plurality of phase difference pixels.

The first photographing unit may include a micro lens array. In addition, the controller may generate the first depth map by using a first directional image and a second directional image which pass through the micro lens array and are focused on an image sensor.

The controller may generate a third depth map by combining the first depth map and the second depth map.

The controller may generate the third depth map by defining a boundary of an object in the first depth map and correcting a depth value of the object to read a depth value of the second depth map.

The first photographing unit may use a wide-angle lens, and the second photographing unit may use a telephoto lens. In addition, the controller may generate the second depth map with respect to the second image where a subject is closed up by the telephoto lens of the second photographing unit and generate a third depth map by replacing a depth value of an area corresponding to the second depth map with a depth value of the second depth map.

The second photographing unit may include a phase difference image sensor. In addition, the controller may generate a third depth map by using the first image and the second image. The image processor may generate the 3D image by using the first depth map, the second depth map, and the third depth map.

In response to photographing an object which is relatively close to the image photographing apparatus, the image processor may generate the 3D image by using only the generated first depth map.

In response to photographing an object which is relatively distant from the image photographing apparatus, the image processor may generate the 3D image by using the generated first depth map and second depth map.

The image photographing apparatus may further include a position controller configured to control a position of the second photographing unit. In addition, a distance between the first photographing unit and the second photographing unit may vary depending upon the position of the second photographing unit.

A method of photographing an image according to an exemplary embodiment includes photographing a subject by using a first photographing unit having a phase difference image sensor, photographing the subject by using a second photographing unit, generating a first depth map by using a first image photographed by the first photographing unit and generating a second depth map by using a second image photographed by the second photographing unit, and generating a three-dimensional (3D) image by using the first depth map and the second depth map.

At least a part of pixels among entire pixels constituting a phase difference image sensor may be a plurality of phase difference pixels which are placed in a horizontal direction, a vertical direction, or a diagonal direction.

The first photographing unit may include a micro lens array. In addition, the generating the first depth map may include generating the first depth map by using a first directional image and a second directional image which pass through the micro lens array and are focused on an image sensor.

The generating a 3D image may include generating a third depth map by combining the first depth map and the second depth map.

The generating the third depth map may include generating the third depth map by defining a boundary of an object in the first depth map and correcting a depth value of the object to read a depth value of the second depth map.

According to various exemplary embodiments above, there is provided a 3D image photographing apparatus for generating a depth map having accurate and abundant depth information.

BRIEF DESCRIPTION OF THE DRAWINGS

The above and/or other aspects will be more apparent by describing certain exemplary embodiments with reference to the accompanying drawings, in which:

FIG. 15 is a flowchart illustrating a method of photographing an image according to an exemplary embodiment.

DETAILED DESCRIPTION OF EXEMPLARY EMBODIMENTS

Figure 1:
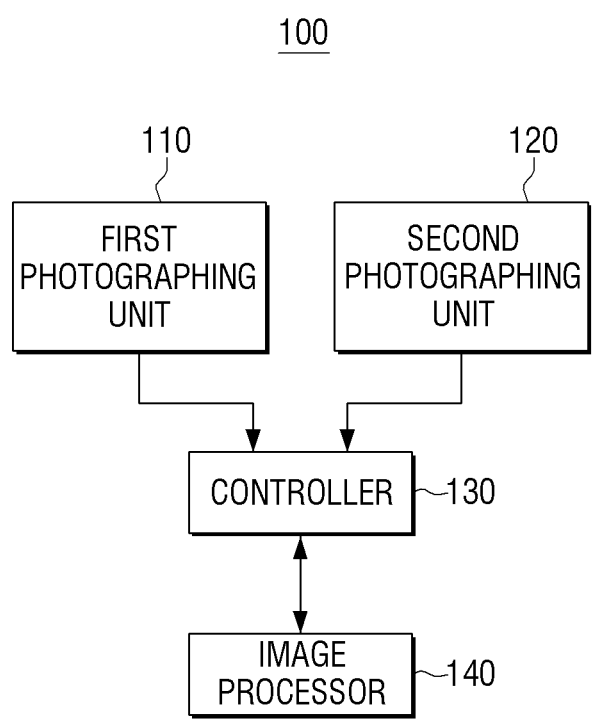
FIG. 1 is a block diagram illustrating a structure of an image photographing apparatus according to an exemplary embodiment.

Hereinafter, terms that are used in the specification will be briefly described, and exemplary embodiments will be described in detail. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms including descriptive or technical terms used herein should be construed as having meanings that are understood to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

One or more exemplary embodiments of the present disclosure will now be described more fully with reference to the accompanying drawings. However, the one or more exemplary embodiments of the present disclosure may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments of the present disclosure to those of ordinary skill in the art. In the following description, well-known functions or constructions are not described in detail because the well-known functions would obscure the one or more exemplary embodiments of the present disclosure with unnecessary detail. Like reference numerals in the drawings denote like or similar elements throughout the specification.

Figure 2:
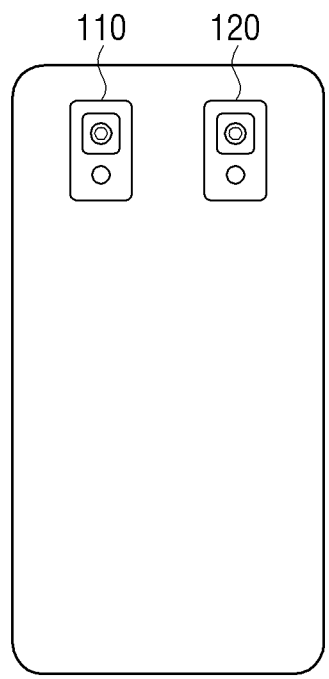
FIG. 2 is a diagram illustrating an image photographing apparatus according to an exemplary embodiment.
Figure 3:
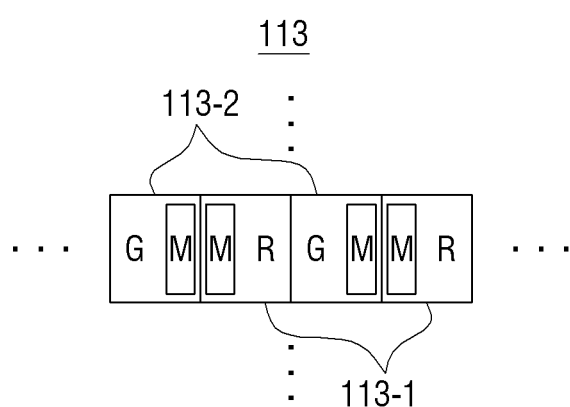
FIG. 3 is a diagram illustrating a phase difference image sensor according to an exemplary embodiment.

FIG. 1 is a block diagram illustrating a structure of an image photographing apparatus according to an aspect of an exemplary embodiment. FIG. 2 is a diagram illustrating an image photographing apparatus according to an aspect of an exemplary embodiment. FIG. 3 is a diagram illustrating a phase difference image sensor of the image photographing apparatus according to an aspect of an exemplary embodiment.

An image photographing apparatus 100 according to various exemplary embodiments may be implemented as one of various electronic devices. For example, the image photographing apparatus 100 may be implemented as one of a digital camera, an MP3 player, a Portable Multimedia Player (PMP), a smart phone, a cellular phone, a smart eyeglasses pair, a tablet Personal Computer (PC), and a smart watch.

Referring to FIG. 1, the image photographing apparatus 100, according to an aspect of an exemplary embodiment, includes a first photographing unit 110, a second photographing unit 120, a controller 130, and an image processor 140.

The first photographing unit 110 may photograph a subject. The first photographing unit 110 may include a lens, a shutter, an aperture, an image sensor, an Analog Front End (AFE), and a Timing Generator (TG).

The lens is a component configured to receive a light of a subject and may include at least one of a zoom lens and a focus lens.

The shutter is configured to control a time a light enters the image photographing apparatus 100. Radiation intensity, which is accumulated in a light-exposed pixel of the image sensor, is determined depending upon a shutter speed.

The aperture (not shown) is configured to control a quantity of light which enters the image photographing apparatus 100 by passing through a lens. The aperture has a mechanical structure configured to gradually increase or decrease a size of an opened portion in order to control quantity of incident light. The size of the opened portion is represented by an aperture value, which is called an 'F' value. The size of the opened portion increases as the aperture value decreases, and thus, as the aperture value decreases, the quantity of incident light may increase, thereby generating a bright image.

The image sensor is a component in which an image of the subject that passed through the lens is formed. The image sensor includes a plurality of pixels arranged in a matrix form. Each of the plurality of pixels accumulates photocharges according to the incident light, and outputs an image corresponding to the accumulated photocharges in a form of an electronic signal. The image sensor may be formed of Complementary Metal Oxide Semiconductor (CMOS) or Charge Coupled Device (CCD).

The image sensor may include a photo diode (PD), a transmission transistor (TX), a reset transistor (RX), and a floating diffusion node (FD). The PD may be configured to generate and accumulate photocharges corresponding to an optical image of a subject. The TX may be configured to transmit the photocharges generated in the PD to the FD in response to a transmission signal. The RX may be configured to discharge the charges stored in the FD in response to a reset signal. A Correlated Double Sampling (CDS) image sensor may perform CDS processing, and an analog-to-digital converter (ADC) may convert a CDS-processed analog signal into a digital signal.

The image sensor of the first photographing unit 110 may include a phase difference image pixel. FIG. 3 illustrates a part of a phase difference image sensor having a phase difference image pixel. As illustrated in FIG. 3, a phase difference image pixel 113 has a mask (M) disposed on a position of a common pixel. At least a part of pixels among all of the pixels constituting the phase difference image sensor may be a plurality of phase difference pixels arranged in a horizontal direction. A right eye image may be focused on a right phase difference pixel 113-1, a mask of which is located on a left area of the pixel, and a left eye image may be focused on a left phase difference pixel 113-2, a mask of which is located on a right area of the pixel. According to an aspect of an exemplary embodiment, all of the pixels of the image sensor of the first photographing unit 110 may be phase difference image pixels.

The TG may be configured to output a timing signal for reading out pixel data of an image sensor. The TG may be controlled by the controller 130.

The AFE may be configured to sample an electronic signal output from the image sensor, and digitize the sample. The AFE may be controlled by the controller 130.

According to an aspect of an exemplary embodiment, the image sensor may be formed of other components which do not require the AFE and the TG. Specifically, an image sensor implemented as a CMOS type may not require such components.

The second photographing unit 120 may photograph a subject in a manner similar to the first photographing unit 110. As shown in FIG. 2, an image photographing apparatus 100-1 according to various exemplary embodiments includes a plurality of image photographing means, specifically, the first photographing unit 110 and the second photographing unit 120. Similar to the first photographing unit 110, the second photographing unit 120 may include a lens, a shutter, an aperture, an image sensor, an AFE, and a TG.

As shown in FIG. 2, the second photographing unit 120 may be located proximate to the first photographing unit 110 on the image photographing apparatus 100-1. Specifically, the first photographing unit 110 and the second photographing unit 120 may be arranged in a horizontal direction.

In addition, as described above, the image sensor of the first photographing sensor 110 may include a plurality of phase difference pixels. In this case, a separation distance between the first photographing unit 110 and the second photographing unit 120 may be greater than a phase difference of the plurality of phase difference pixels.

The controller 130 may be configured to control overall operation of the image photographing apparatus 100. The controller 130 may acquire raw image data by controlling the first photographing unit 110 and the second photographing unit 120, and may display a live view image on a display (not shown) by controlling the image processor 140. In response to receiving a photographing command, such as operation of a shutter-release button, etc., the controller 130 may control the image processor 140 to image-process the raw image data, and generate a still image. The controller 130 may control the image processor 140 to acquire a first image and a second image from the raw image data acquired from each of the first photographing unit 110 and the second photographing unit 120.

Specifically, the controller 130 may generate a first depth map using the first image photographed by the first photographing unit 110, and generate a second depth map using the second image photographed by the second photographing unit 120.

Depth represents a depth of a 3D image, and corresponds to a degree of binocular disparity between a left eye image frame and a right eye image frame of a 3D image frame. A degree of a 3D effect that a human perceives may vary depending upon a depth. That is, as the depth is far, the binocular disparity between both eyes increases, and thus, the 3D effect degree is perceived as being relatively intense. As the depth is close, the binocular disparity between both eyes decreases, and thus, the 3D effect degree is perceived as being relatively less intense.

A depth map is a table including depth information on each area of a 3D image. An area may be individual pixel units, or predetermined areas larger than a pixel unit. A depth may represent a depth with respect to each area, or each pixel of a 3D image frame. According to an aspect of an exemplary embodiment, a depth map may correspond to a two-dimensional (2D) grayscale image, with each pixel of an image frame representing a depth with respect to the pixel.

The controller 130 includes hardware components, such as a Central Processing Unit (CPU), a cache memory, and the like, as well as software components, such as an application for achieving a particular purpose. A control command with respect to each component of the image photographing apparatus 100 may be read from a memory according to a system clock. According to the read control command, an electronic signal may be generated to operate each of the hardware components.

Although it has been described that the controller 130 generates the first depth map using the first image photographed by the first photographing unit 110 and generates the second depth map using the second image photographed by the second photographing unit 120, the controller 130 may be differently implemented. That is, the image processor 140 may be configured to perform the aforementioned function. The image processor 140 will be described below.

The image processor 140 may be configured to process the raw image data photographed by the first photographing unit 110 and the second photographing unit 120, and convert the processed raw image data to YCbCr data. In addition, the image processor 140 may be configured to determine an image black level, and adjust color sensitivity rates. The image processor 140 also may also be configured to adjust white balance and perform gamma correction, color interpolation, color compensation, and resolution conversion. Specifically, the image processor 140 may be configured to generate a 3D image using the first depth map and the second depth map.

The phase difference image sensor has a much smaller disparity than a disparity between the first photographing unit 110 and the second photographing unit 120. Thus, the raw image data obtained by the phase difference image sensor has relatively accurate pixel information with respect to an object. When there is a small disparity, the raw image data is similar to 2D image data, and thus, there is minimal image data loss with respect to the object. In particular, it is possible to identify a clear silhouette from a depth map obtained from the raw image data because there is less data loss along a boundary area of an object. However, because the disparity of the phase difference image sensor is small, the depth information on each object is not that extensive in general.

By contrast, the second depth map generated using the image of the first photographing unit 110 and the image of the second photographing unit 120 has extensive depth information, because the disparity according to a distance is detected precisely as the first photographing unit 110 and the second photographing unit 120 are separated by a predetermined distance. In other words, a depth map having high resolution may be generated from each object. However, as the space between the first photographing unit 110 and the second photographing unit 120 increases, additional image data with respect to an object is lost. In particular, data loss along a boundary area of the object in a depth map obtained using the first photographing unit 110 and the second photographing unit 120 increases as the space between the photographing units increases, and thus, depth map information having blurred silhouette may be obtained.

Due to such characteristics, when photographing an object located relatively close to the image photographing apparatus 100, the image processor 140 of the image photographing apparatus 100, according to an aspect of an exemplary embodiment, may generate the 3D image using only the generated first depth map. That is, when an object is located relatively close to the image photographing apparatus 100, a 3D image obtained by the first depth map is similar to 2D image data, and rarely results in loss of the image data with respect to the object. Accordingly, data loss along the boundary area of the object is low, and a depth map having a distinct silhouette may be obtained. An input user setting may be used to indicate whether an object is located close to the image photographing apparatus 100.

When photographing an object located relatively distant from the image photographing apparatus 100, the image processor 140 may generate the 3D image using the generated first depth map and the second depth map. As described above, the second depth map generated using the image of the first photographing unit 110 and the image of the second photographing unit 120 have extensive depth information, and thus, a depth map having high resolution with respect to each object may be generated. As discussed above, whether an object is located close to the image photographing apparatus 100 may be determined according to an input user setting.

In addition, according to an aspect of an exemplary embodiment, the controller 130 of the image photographing apparatus 100 may generate a third depth map by combining the first depth map and the second depth map, and the image processor 140 may generate a 3D image using the generated third depth map.

The controller 130 of the image photographing apparatus 100 may generate the third depth map by combining the first depth map, which has low depth resolution and a clear boundary of the object, with the second depth map, which has a high depth resolution and a relatively blurry boundary of the object. The image processor 140 may generate a 3D image using the generated third depth map.

As described above, a single image processor 140 may perform the above operations, but an image photographing apparatus is not limited thereto, and aspects of exemplary embodiments may include a plurality of image processors. For example, the first photographing unit 110 may include a first image processor, and the second photographing unit 120 may include a second image processor. In this case, each image processor may be configured to perform a pre-processing operation with respect to the raw image data. Specifically, if multiple image processors are implemented to generate a depth map, the first image processor may be configured to generate the first depth map, and the second image processor may be configured to generate the second depth map. The third depth map may be generated by the first image processor or the second image processor.

Figure 4:
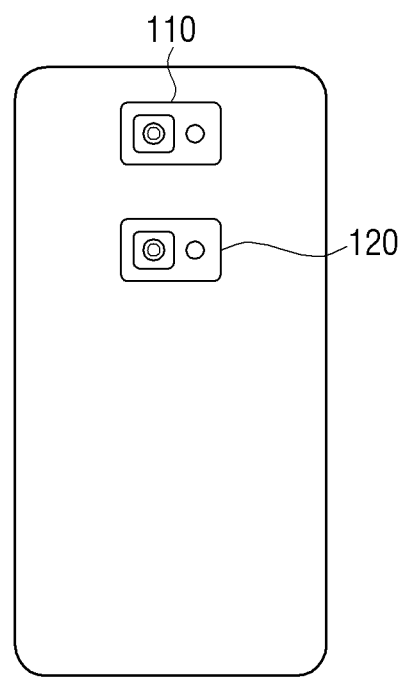
FIG. 4 is a diagram illustrating an image photographing apparatus according to an exemplary embodiment.
Figure 5:
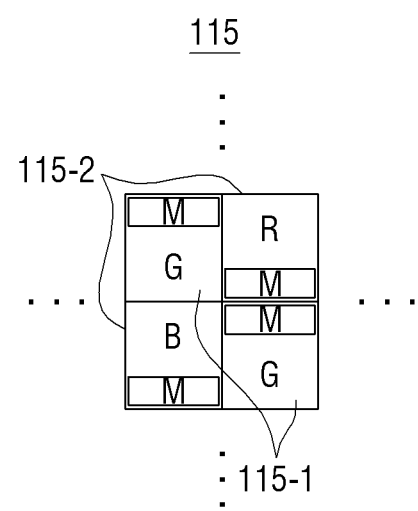
FIG. 5 is a diagram illustrating a phase difference image sensor according to an exemplary embodiment.

FIG. 4 is a diagram illustrating an image photographing apparatus 100-2 according to an aspect of an exemplary embodiment, and FIG. 5 is a diagram illustrating an exemplary phase difference image sensor of the image photographing apparatus 100-2.

As shown in FIG. 4, the image photographing apparatus 100-2 may have the first photographing unit 110 and the second photographing unit 120 arranged in a vertical direction. As described above, the first photographing unit 110 and the second photographing unit 120 may be separated by a predetermined distance, thereby resulting in the disparity.

In addition, as shown in FIG. 5, at least a part of pixels among all the pixels constituting a phase difference image sensor may be phase difference pixels 115 arranged in a vertical direction. An image in a downward direction may be focused on a lower phase difference pixel 115-1, a mask of which is placed on an upper area of the pixel, and an image in an upward direction may be focused on an upper phase difference pixel 115-2, a mask of which is placed on a lower area of the pixel. According to an aspect of an exemplary embodiment, all of the pixels of the image sensor of the first photographing unit 110 may be phase difference pixels.

The separation distance between the first photographing unit 110 and the second photographing unit 120 may be greater than a phase difference of the plurality of phase difference pixels.

Figure 6:
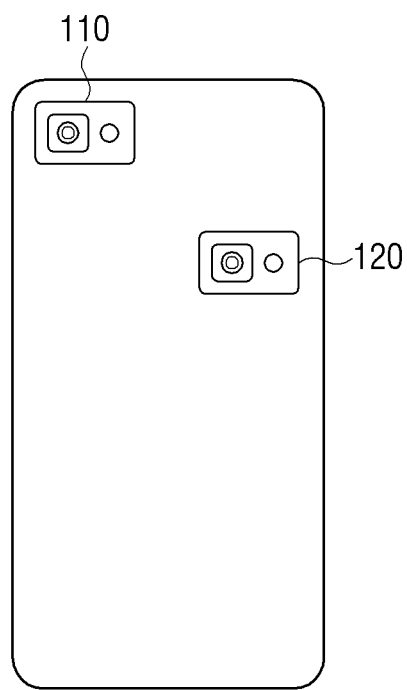
FIG. 6 is a diagram illustrating an image photographing apparatus according to an exemplary embodiment.
Figure 7:
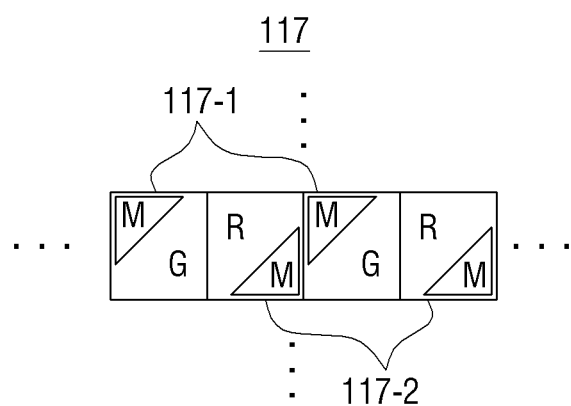
FIG. 7 is a diagram illustrating a phase difference image sensor according to an exemplary embodiment.

FIG. 6 is a diagram illustrating an image photographing apparatus 100-3 according to an aspect of an exemplary embodiment, and FIG. 7 is a diagram illustrating an exemplary phase difference image sensor of the image photographing apparatus 100-3.

As shown in FIG. 6, the image photographing apparatus 100-3 may include the first photographing unit 110 and the second photographing unit 120 arranged in a diagonal direction. As described above, the first photographing unit 110 and the second photographing unit 120 may be separated by a predetermined distance, thereby resulting in disparity.

As shown in FIG. 7, at least a part of all the pixels constituting a phase difference image sensor may be phase difference pixels 117 arranged in a diagonal direction. An image in a right downward direction may be focused on a right lower phase difference pixel 117-1, a mask of which is placed on a left upper area of the pixel, and an image in a left upward direction may be focused on a left upper phase difference pixel 117-2, a mask of which is placed on a right lower area of the pixel. According to an aspect of an exemplary embodiment, all of the pixels of the image sensor of the first photographing unit 110 may be phase difference pixels.

The separation distance between the first photographing unit 110 and the second photographing unit 120 may be greater than a phase difference of the plurality of phase difference pixels.

Meanwhile, the image photographing apparatus 100 according to various aspects of exemplary embodiments may further include components of an electronic apparatus configured to perform a common image photographing operation and an image processing operation.

That is, the image photographing apparatus 100 may include one or more of a motor driver configured to drive a focusing lens to adjust a focus, a Secure Digital Random Access Memory (SDRAM) configured to store raw image data, intermediate image data, and final image data, a firmware program, various types of adjustment information which correspond to the specification of the image photographing apparatus 100, a flash memory configured to store setting information and other preferences of the image photographing apparatus 100 according to a user input, a JPEG codec for compressing YCbCr data, a communication unit configured to transmit and receive image data, a Universal Serial Bus (USB) module configured to transmit and receive data with an external apparatus in a wired manner, a High Definition Multimedia Interface (HDMI) module, a Mobile High-Definition Link (MHL) module, a memory card, which is detachable from an apparatus, a user interface (formed of text, icons, and the like), an object, information on an image photographing apparatus, a display configured to display a live view or a photographed image, an electronic viewfinder, at least one button configured to receive a user input, a touch screen, an input unit including a proximity sensor, a power supply configured to supply power, a housing which accommodates the component, and the like. In addition, the storage stores an operating system, an application, firmware, and the like for performing the above-described operations.

According to an aspect of an exemplary embodiment, the first photographing unit 110 may be implemented as a plenoptic camera or a light field camera.

A light field camera is an image photographing apparatus configured to generate abundant four-dimensional (4D) light information using a micro lens array. The light field camera may obtain 4D light information by combining 2D light information through a main lens and 2D light information accumulated in an image sensor after passing through a micro lens array. Accordingly, the light field camera may be capable of various image effects, such as depth processing, digital refocusing, spherical aberration correction, etc., with a single photographing operation.

Figure 8:
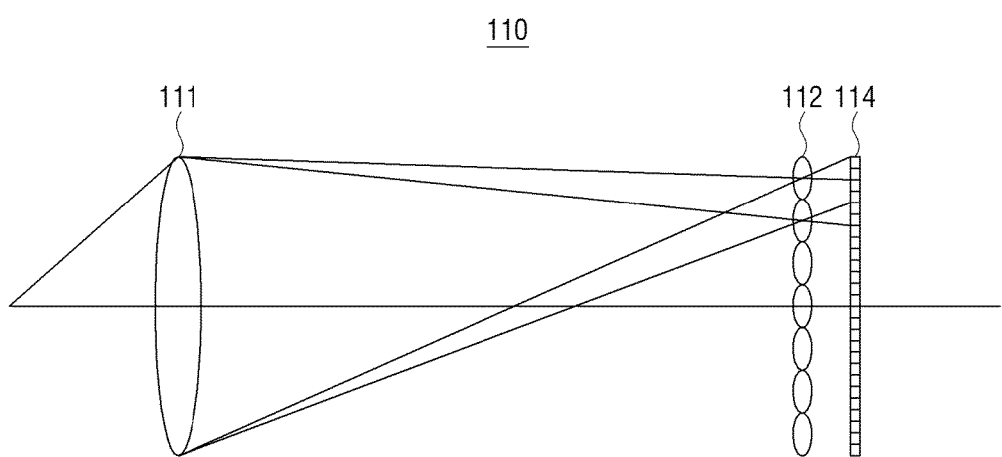
FIG. 8 is a diagram illustrating a structure and an operational principle of a first photographing unit according to an exemplary embodiment.
Figure 9:
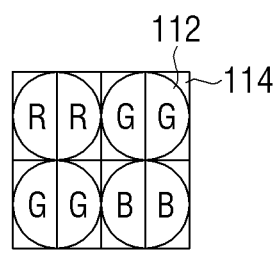
FIG. 9 is a diagram illustrating an arrangement of a micro lens and a Bayer pattern of the first photographing unit according to an exemplary embodiment.

FIG. 8 is a diagram illustrating a structure and an operational principle of the first photographing unit 110 of an image photographing apparatus according to an aspect of an exemplary embodiment, and FIG. 9 is a diagram illustrating an arrangement of a micro lens and a Bayer pattern of the first photographing unit 110 according to an aspect of an exemplary embodiment.

As shown in FIG. 8, the first photographing unit 110 may include a main lens 111, a micro lens array 112, and an image sensor 114. In FIG. 8, some of the components of the first photographing unit 110 are omitted.

The main lens 111 is configured to transmit a light reflected from a subject. The main lens 111 may be implemented as a common general-purpose lens or a wide angle lens. As shown in FIG. 8, the main lens 111 may be formed of a single lens, however according to an aspect of an exemplary embodiment, the main lens 111 may be formed of a plurality of lenses.

The micro lens array 112 is configured to transmit a light which passes through the main lens 111. As shown in FIG. 8, the micro lens array 112 may be an array including a plurality of micro lens 112 connected in a horizontal direction. Each micro lens constituting the micro lens array respectively retransmits the light which passed through the main lens 111. The retransmitted light is incident on the image sensor 114.

Each sensing area of the image sensor 114 includes a plurality of pixels. Light from all directions reflected from a certain point of a subject pass through the micro lens array 112, and are accumulated on a corresponding area of the image sensor 114. A common camera only reflects a portion of light reflected from a certain point of a subject onto a unit area of the image sensor 114. According to an aspect of an exemplary embodiment, light which is reflected from a certain point of a subject falls into the main lens 111, and is divided into lights in m directions. The light which passed through a single micro lens may accumulate on m distinct areas of the image sensor 114. A single distinct area of the image sensor 114 accumulates the light with respect to a direction. Accordingly, each area of the image sensor 114 distinguishes and accumulates the light, which pass through the main lens 111, according to each direction. Meanwhile, a sub image may be generated by combining only information on the lights in the same direction out of the areas of the image sensor 130 corresponding to the plurality of micro lens, and the sub image becomes an image having a view in a particular direction.

Although not shown in the drawings, according to an aspect of an exemplary embodiment, the first photographing unit 110 may further include a Bayer pattern for a color filter.

A Bayer pattern may be located on the image sensor 114, or between the image sensor 114 and the micro lens array 112. The Bayer pattern may be formed of data patterns of red, green, and blue. Pixel data may be realized by appropriately combining each color data.

According to an aspect of an exemplary embodiment, the Bayer-patterned color filter may be located in front of the micro lens array 112, or the color filter may be coded on the micro lens array 112. The image sensor 114 is configured to sense a monochrome image signal.

Although only red, green, and blue data patterns have been discussed for the color filter, these have been given as examples, and filters of various colors, such as cyan, magenta, yellow, white, emerald, etc., may be used.

As shown in FIG. 9, the Bayer pattern may be arranged on the single micro lens array 112 such that each of the color filter components may be divided in two. In this case, the color filter may perform a function similar to the above-described phase difference pixel. When light passes through the single micro lens 112, an image is focused on two pixels. Accordingly, it is possible to generate an image in a first direction using an image detected by one of the two pixels and generate an image in a second direction using an image detected by the other of the two pixels.

Accordingly, the controller 130 may generate a first depth map using the images in the first and the second directions which are focused on the image sensor by the micro lens array 112.

As described above, the controller 130 may generate a third depth map using the first depth map and a second depth map. Hereinafter, a method of generating the third depth map will be described. The method may be applied to all of the aforementioned various exemplary embodiments.

Figure 10:
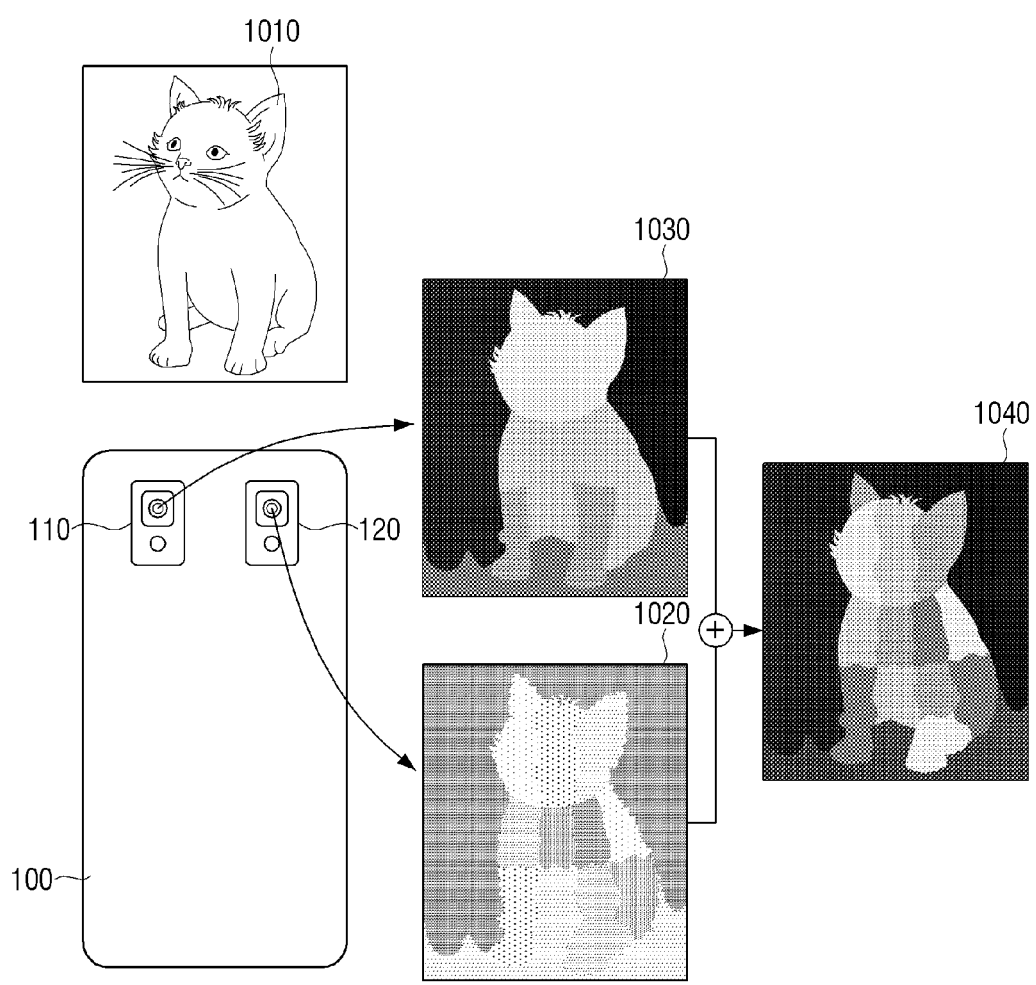
FIG. 10 is a schematic diagram illustrating a method of generating a third depth map according to an exemplary embodiment.

FIG. 10 is a schematic diagram illustrating a method of generating a third depth map according to an aspect of an exemplary embodiment.

The controller 130 may be configured to generate the third depth map by defining a boundary of an object in the first depth map and correcting a depth value of the object to correspond to a depth value of the second depth map.

For example, as shown in FIG. 10, the controller 130 may be configured to photograph an object 1010 by controlling the first photographing unit 110 and the second photographing unit 120. In addition, according to the above-described method, the controller 130 may generate a first depth map 1030 using a first image photographed by the first photographing unit 110 and generates a second depth map 1020 using a second image photographed by the second photographing unit 120.

The controller 130 may be configured to define a boundary of an object using the first depth map 1030 and the first image. As the result, a silhouette of the object may be determined. In addition, the controller 130 may be configured to generate a third depth map 1040 by replacing a depth value of the object within the defined boundary with a depth value of a corresponding area from the second depth map. The generated third depth map 1040 is characterized in that a boundary of the object is distinct and depth resolution in the object is high.

The image processor 140 may be configured to generate a 3D image using the generated third depth map 1040.

Figure 11:
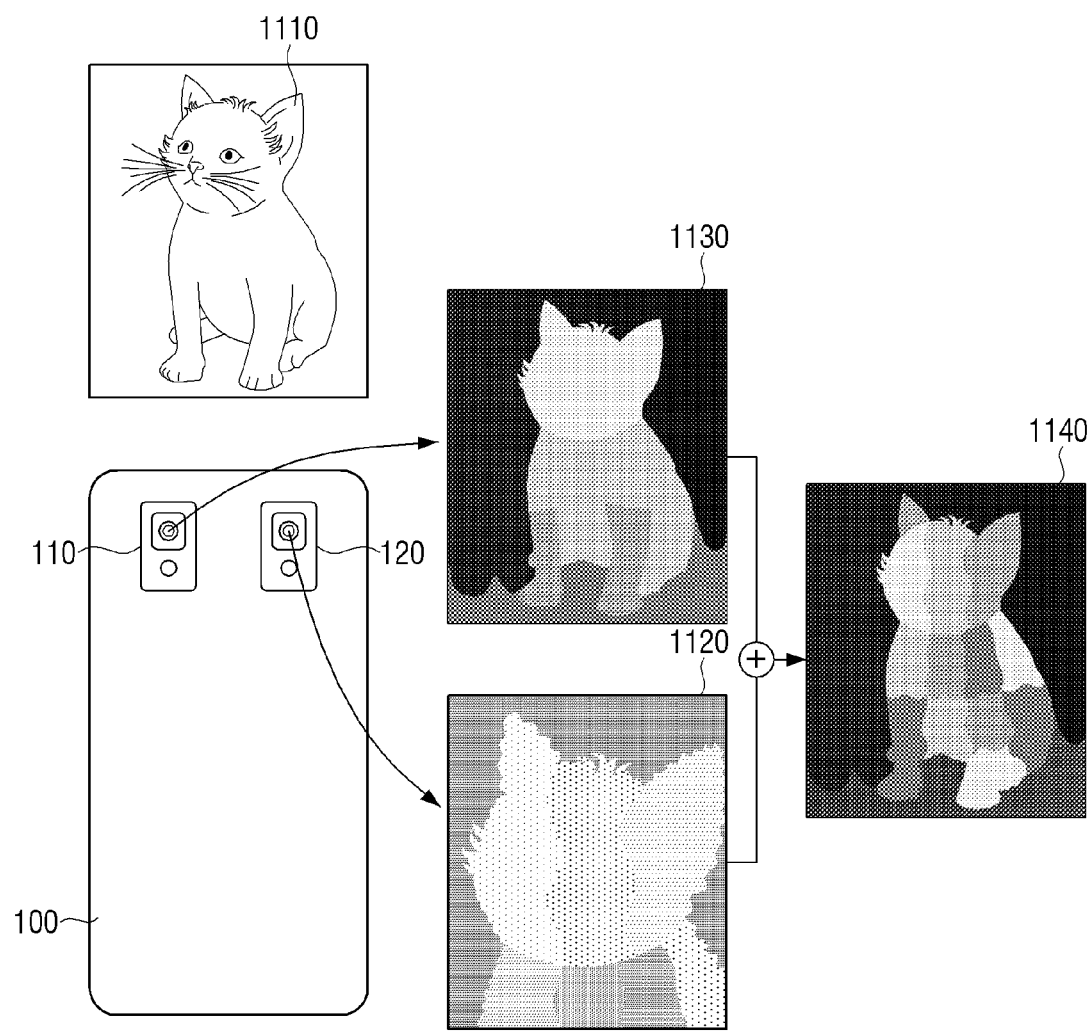
FIG. 11 is a schematic diagram illustrating a method of generating a third depth map according to an exemplary embodiment.

FIG. 11 is a schematic diagram illustrating a method of generating a third depth map according to an aspect of an exemplary embodiment.

As shown in FIG. 11, the image photographing apparatus 100 may be configured to photograph an object 1110. The first photographing unit 110 may include a wide angle lens, and the second photographing unit 120 may include a telephoto lens.

In this case, the controller 130 may be configured to generate a second depth map 1120 with respect to a second image photographed using a telephoto lens of the second photographing unit 120. In addition, the controller 130 may be configured to generate a third depth map 1140 by replacing a depth value of the first depth map 1130 with corresponding depth value from the second depth map 1120. As the result, as shown in FIG. 11, a portion of the final depth map 1140 may have extensive depth values.

Meanwhile, the image photographing apparatus may be implemented so that the first photographing unit 110 includes a wide angle lens, and the second photographing unit 120 includes a common zoom lens. In this case, to determine the third depth map 1140, the first photographing unit 110 photographs a wide angle view of a subject, and the second photographing unit 120 photographs a zoomed view of the subject.

Figure 12:
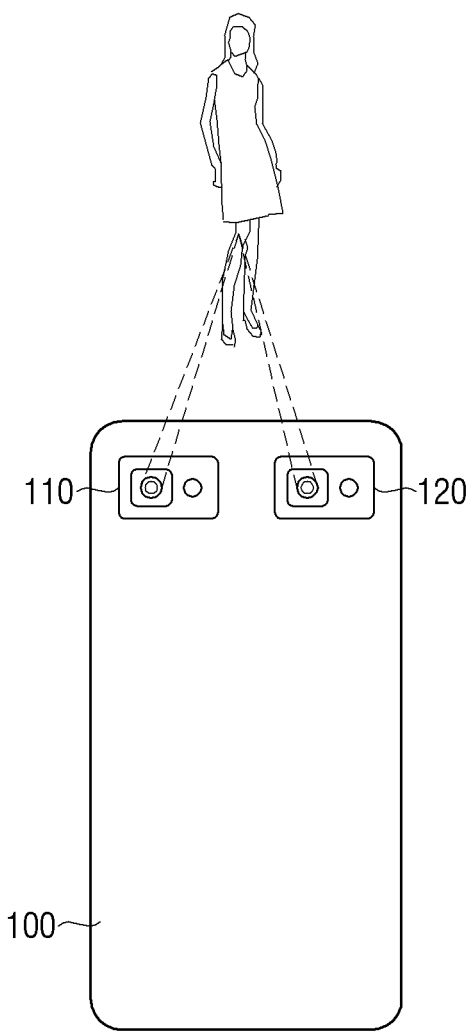
FIG. 12 is a diagram illustrating an image photographing apparatus according to an exemplary embodiment.

FIG. 12 is a diagram illustrating an image photographing apparatus 100-4 according to an aspect of an exemplary embodiment.

As shown in FIG. 12, the image photographing apparatus 100-4 may be implemented so that both of the first photographing unit 110 and the second photographing unit 120 have either a phase difference image sensor or the above-described micro lens array structure.

In this case, the controller 130 may be configured to generate a first depth map using a first image photographed by the first photographing unit 110, and generate a second depth map using a second image photographed by the second photographing unit 120. In addition, the controller 130 may be configured to generate the third depth map using the first image and the second image.

The first depth map and the second depth map may be generated using phase difference images obtained using phase difference image sensors. Thus, the first depth map and the second depth map have depth map information having a distinct silhouette with minimal data loss of a boundary area of an object. However, the third depth map, generated with the first image and the second image, is characterized in that an object has high depth resolution due to the great disparity between the first photographing unit 110 and the second photographing unit 120, but a relatively blurry silhouette of the object.

In this case, the controller 130 may be configured to generate a fourth depth map using the first depth map, the second depth map, and the third depth map. As the depth maps are combined, a depth map having more accurate and higher depth resolution may be generated.

According to an aspect of an exemplary embodiment, the first photographing unit 110 may have a phase difference image sensor, and the second photographing unit 120 may have a low-resolution image sensor. In this case, power consumption may be reduced. A compensation operation may then be performed on the resulting depth map to improve quality.

Figure 13:
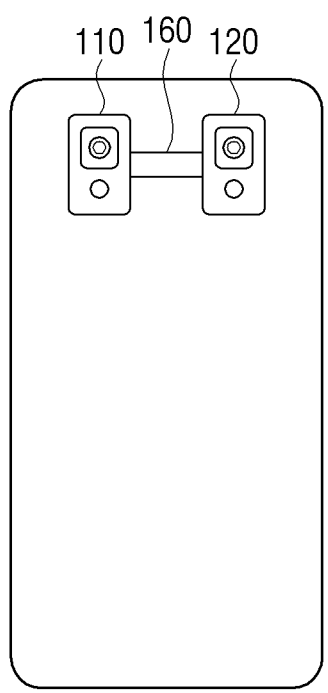
FIG. 13 is a diagram illustrating an image photographing apparatus according to an exemplary embodiment.

FIG. 13 is a diagram illustrating an image photographing apparatus 100-5 according to an aspect of an exemplary embodiment.

As shown in FIG. 13, the image photographing apparatus 100-5 may include a position controller 160 configured to control a position of the first photographing unit 110 or the second photographing unit 120. A distance between the first photographing unit 110 and the second photographing unit 120 varies depending upon the position of the first photographing unit 110 or the second photographing unit 120.

According to an aspect of an exemplary embodiment, the position controller 160 may include a slide rail. That is, the position controller 160 may have a structure on which the image sensor and the lens of the second photographing unit 120 are able to move on the slide rail thereof. For example, a housing that accommodates an image sensor and a lens may include a wheel movable on a slide rail. In this case, the position controller 160 may control the position of the second photographing unit 120 by manually or automatically rotating the wheel. Further, the position controller 160 may be implemented as any one of various mechanical structures known to an artisan of ordinary skill that may be configured to control the position of the second photographing unit 120, and thereby control a distance between the first photographing unit 110 and the second photographing unit 120. In addition, in FIG. 13, the first photographing unit 110 and the second photographing unit 120 are placed in a horizontal direction. However, as described above according to various aspects of exemplary embodiments, the first photographing unit 110 and the second photographing unit 120 may be disposed relative to each other in a vertical direction or in a diagonal direction.

Hereinafter, exemplary methods of photographing an image according to various aspects of exemplary embodiments will be described.

Figure 14:
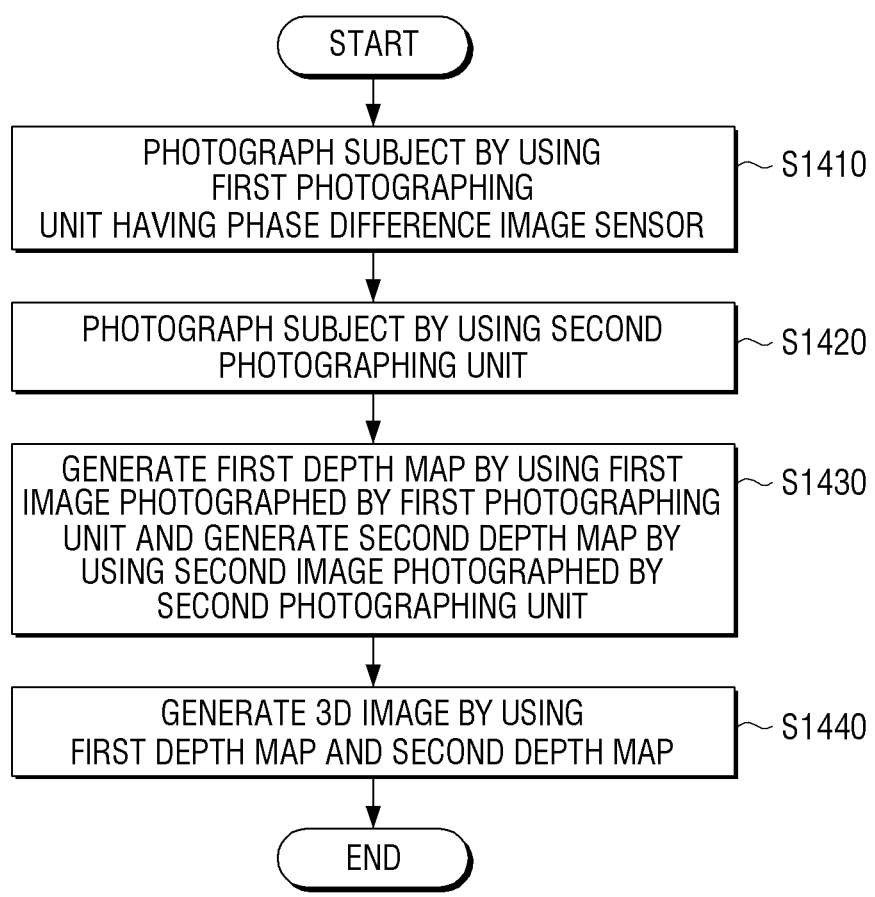
FIG. 14 is a flowchart illustrating a method of photographing an image according to an exemplary embodiment.

FIGS. 14 and 15 are flowcharts illustrating exemplary methods of photographing an image.

Referring to FIG. 14, a method of photographing an image, according to an aspect of an exemplary embodiment, includes photographing a subject using a first photographing unit having a phase difference image sensor (S1410), photographing the subject using the second photographing unit (S1420), generating a first depth map using a first image photographed by the first photographing unit, generating a second depth map using a second image photographed by the second photographing unit (S1430), and generating a 3D image using the first depth map and the second depth map (S1440).

In this case, at least a part of pixels among all of the pixels constituting the phase difference image sensor may be a plurality of phase difference pixels arranged in one of a horizontal direction, a vertical direction, and a diagonal direction.

In addition, the first photographing unit and the second photographing unit may be placed in one of a horizontal direction, a vertical direction, and a diagonal direction. A separation distance between the first photographing unit and the second photographing unit may be greater than a phase difference of the plurality of phase difference pixels.

The first photographing unit may include a micro lens array. The first depth map may be generated using an image in a first direction and an image in a second direction, which are focused on the image sensor by passing through the micro lens array.

The 3D image may be generated using a third depth map generated by combining the first depth map and the second depth map.

Referring to FIG. 15, a method of photographing an image according to an aspect of an exemplary embodiment includes photographing a subject using a first photographing unit having a phase difference image sensor (S1510), photographing the subject using the second photographing unit (S1520), generating a first depth map using a first image photographed by the first photographing unit, generating a second depth map using a second image photographed by the second photographing unit (S1530), and generating a third depth map using the first depth map and the second depth map (S1540). In this case, the third depth map may be generated by defining a boundary of an object in the first depth map and correcting a depth value of the object to correspond to a depth value of the second depth map.

In addition, the second photographing unit may include a telephoto lens. The second depth map may be generated based on a zoomed second image photographed using the telephoto lens of the second photographing unit. In addition, the third depth map may be generated by replacing a value of an area corresponding to the second depth map in the first depth map with a depth value of the second depth map.

The above-described exemplary image photographing methods may be stored on a non-transitory computer-readable recording medium in the form of a program. For example, the above-described various applications and programs may be stored and provided in a non-transitory computer readable recording medium such as a compact disc (CD), a digital versatile disk (DVD), a hard disk, a Blu-ray disk, a universal serial bus (USB), a memory card, a read-only memory (ROM), and the like.

In addition, the above-described image photographing methods may be embedded in a hardware Integrated Circuit (IC) chip in the form of embedded software such as a Field-Programmable Gate Array (FPGA). Alternatively, the above-described image photographing methods may be included as a part of components of the image photographing apparatus 100.

While this disclosure includes specific examples, it will be understood to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image photographing apparatus comprising:
    a first photographing unit configured to photograph an image by using a phase difference image sensor;
    a second photographing unit configured to be spaced on a side of the first photographing unit;
    a controller configured to:
        generate a first depth map using a first image photographed by the first photographing unit; and
        generate a second depth map using the first image and a second image photographed by the second photographing unit; and
    an image processor configured to generate a three-dimensional (3D) image using the first depth map and the second depth map with the first image and the second image.

2. The apparatus as claimed in claim 1, wherein at least a part of pixels among entire pixels constituting the phase difference image sensor are a plurality of phase difference pixels which are placed in a horizontal direction.

3. The apparatus as claimed in claim 2, wherein the first photographing unit and the second photographing unit are placed in a horizontal direction, and
    wherein a separation distance between the first photographing unit and the second photographing unit is greater than a phase difference of the plurality of phase difference pixels.

4. The apparatus as claimed in claim 1, wherein at least a part of pixels of the entire pixels constituting the phase difference image sensor are a plurality of phase difference pixels which are placed in a vertical direction.

5. The apparatus as claimed in claim 4, wherein the first photographing unit and the second photographing unit are placed in a vertical direction, and
    wherein a separation distance between the first photographing unit and the second photographing unit is greater than a phase difference of the plurality of phase difference pixels.

6. The apparatus as claimed in claim 1, wherein at least a part of pixels of the entire pixels constituting the phase difference image sensor are a plurality of phase difference pixels which are placed in a diagonal direction.

7. The apparatus as claimed in claim 6, wherein the first photographing unit and the second photographing unit are placed in a diagonal direction, and
    wherein a separation distance between the first photographing unit and the second photographing unit is greater than a phase difference of the plurality of phase difference pixels.

8. The apparatus as claimed in claim 1, wherein the first photographing unit comprises a micro lens array, and
    wherein the controller generates the first depth map by using a first directional image and a second directional image which pass through the micro lens array and are focused on an image sensor.

9. The apparatus as claimed in claim 1, wherein the controller generates a third depth map by combining the first depth map and the second depth map.

10. The apparatus as claimed in claim 9, wherein the controller generates the third depth map by defining a boundary of an object in the first depth map and correcting a depth value of the object to read a depth value of the second depth map.

11. The apparatus as claimed in claim 1, wherein the first photographing unit uses a wide-angle lens, and the second photographing unit uses a telephoto lens, and
    wherein the controller generates the second depth map with respect to the second image where a subject is closed up by the telephoto lens of the second photographing unit and generates a third depth map by replacing a depth value of a first depth map area corresponding to the second depth map with a depth value of the second depth map.

12. The apparatus as claimed in claim 1, wherein the second photographing unit comprises a phase difference image sensor,
    wherein the controller generates a third depth map by using the first image and the second image, and
    wherein the image processor generates the 3D image by using the first depth map, the second depth map, and the third depth map.

13. The apparatus as claimed in claim 1, wherein in response to photographing an object which is relatively close to the image photographing apparatus, the image processor generates the 3D image by using only the generated first depth map.

14. The apparatus as claimed in claim 1, wherein in response to photographing an object which is relatively distant from the image photographing apparatus, the image processor generates the 3D image by using the generated first depth map and second depth map.

15. The apparatus as claimed in claim 1, further comprising:
    a position controller configured to control a position of the second photographing unit,
    wherein a distance between the first photographing unit and the second photographing unit varies depending upon the position of the second photographing unit.

16. A method of photographing an image, the method comprising:
    photographing a subject by using a first photographing unit having a phase difference image sensor;
    photographing the subject by using a second photographing unit;
    generating a first depth map using a first image photographed by the first photographing unit and generating a second depth map using both the first image photographed by the first photographing unit and a second image photographed by the second photographing unit; and generating a three-dimensional (3D) image by using the first depth map and the second depth map with the first image and the second image.

17. The method as claimed in claim 16, wherein at least a part of pixels among entire pixels constituting the phase difference image sensor are a plurality of phase difference pixels which are placed in a horizontal direction, a vertical direction, or a diagonal direction.

18. The method as claimed in claim 16, wherein the first photographing unit comprises a micro lens array, and wherein the generating the first depth map comprises generating the first depth map by using a first directional image and a second directional image which pass through the micro lens array and are focused on an image sensor.

19. The method as claimed in claim 16, wherein the generating a 3D image comprises generating a third depth map by combining the first depth map and the second depth map.

20. The method as claimed in claim 19, wherein the generating the third depth map comprises generating the third depth map by defining a boundary of an object in the first depth map and correcting a depth value of the object to read a depth value of the second depth map.

* * * * *